(12) United States Patent
Horigome et al.

(10) Patent No.: US 11,486,828 B2
(45) Date of Patent: Nov. 1, 2022

(54) FLUORESCENCE PHOTOMETER AND OBSERVATION METHOD

(71) Applicant: HITACHI HIGH-TECH SCIENCE CORPORATION, Tokyo (JP)

(72) Inventors: Jun Horigome, Tokyo (JP); Kai Maruyama, Tokyo (JP); Koji Kurita, Tokyo (JP); Hideyuki Sakamoto, Tokyo (JP); Rino Nakajima, Tokyo (JP); Naoki Suzuki, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 16/813,538

(22) Filed: Mar. 9, 2020

(65) Prior Publication Data

US 2020/0292453 A1    Sep. 17, 2020

(30) Foreign Application Priority Data

Mar. 12, 2019 (JP) .............................. JP2019-044976

(51) Int. Cl.
*G01N 21/64* (2006.01)
*G01J 3/44* (2006.01)

(52) U.S. Cl.
CPC ............ *G01N 21/64* (2013.01); *G01J 3/4406* (2013.01); *G01N 2021/6417* (2013.01); *G01N 2201/0694* (2013.01)

(58) Field of Classification Search
None
See application file for complete search history.

(56) References Cited

U.S. PATENT DOCUMENTS 4,675,529 A * 6/1987 Kushida ............... G01N 21/645
250/227.11
5,003,977 A * 4/1991 Suzuki ................. A61B 5/0071
600/317

(Continued)

FOREIGN PATENT DOCUMENTS

DE       19854292 A1    7/2000
JP       2004191251 A   7/2004

(Continued)

OTHER PUBLICATIONS

Mostofa, Khan MG, et al. "Three-dimensional fluorescence as a tool for investigating the dynamics of dissolved organic matter in the Lake Biwa watershed." Limnology 6.2 (2005): 101-115. (Year: 2005).*

(Continued)

*Primary Examiner* — Rufus L Phillips
(74) *Attorney, Agent, or Firm* — Holland & Hart LLP

(57) ABSTRACT

A fluorescence photometer includes a photometer unit and an optical fiber unit. The photometer unit includes a light source, an excitation-side spectroscope for separating light emitted from the light source to generate excitation light, and a fluorescence-side spectroscope for separating fluorescent light emitted from a sample irradiated with the excitation light to generate monochromatic light. The optical fiber unit guides the excitation light to the sample placed outside the photometer unit and guides the fluorescent light emitted from the sample to the photometer unit and includes an image fiber for capturing an image of the sample, an excitation-side fiber arranged around the image fiber and for guiding the excitation light to the sample, and a fluorescence-side fiber arranged around the image fiber and to guide the fluorescent light emitted from the sample to the (Continued)

photometer unit. The excitation-side fiber and the fluorescence-side fiber are arranged to surround the image fiber.

10 Claims, 10 Drawing Sheets

(56) References Cited

U.S. PATENT DOCUMENTS

| | | | | |
|---|---|---|---|---|
| 5,512,490 | A * | 4/1996 | Walt | G01N 21/6428 |
| | | | | 250/459.1 |
| 5,751,415 | A * | 5/1998 | Smith | G01J 3/02 |
| | | | | 356/301 |
| 5,972,716 | A * | 10/1999 | Ragusa | C12Q 1/6818 |
| | | | | 422/82.02 |
| 6,539,155 | B1 * | 3/2003 | Broeng | B82Y 20/00 |
| | | | | 385/125 |
| 7,239,782 | B1 * | 7/2007 | Treado | A61B 1/00165 |
| | | | | 356/301 |
| 2002/0109100 | A1 * | 8/2002 | Jackson, III | G01N 21/6456 |
| | | | | 250/458.1 |
| 2003/0081875 | A1 * | 5/2003 | Kochergin | G01N 21/7703 |
| | | | | 385/12 |
| 2004/0004193 | A1 * | 1/2004 | Nilson | A61M 16/104 |
| | | | | 250/458.1 |
| 2006/0223172 | A1 * | 10/2006 | Bedingham | G01N 21/6428 |
| | | | | 435/288.7 |
| 2014/0083251 | A1 * | 3/2014 | Kinoshiro | C21C 1/02 |
| | | | | 75/10.14 |
| 2017/0010153 | A1 * | 1/2017 | Vezard | G01J 3/0291 |
| 2017/0254744 | A1 * | 9/2017 | Haden | G01J 3/0218 |
| 2019/0167116 | A1 * | 6/2019 | Chen | A61B 10/0041 |
| 2020/0033328 | A1 * | 1/2020 | Beer | G01N 21/0332 |

FOREIGN PATENT DOCUMENTS

| | | |
|---|---|---|
| JP | 2006-314557 A | 11/2006 |
| JP | 2012-098244 A | 5/2012 |
| JP | 2012132742 A | 7/2012 |
| JP | 5432793 B2 | 3/2014 |

OTHER PUBLICATIONS

Translation_of_DE_19854292A1.pdf (Year: 2000).*

* cited by examiner

FLUORESCENCE PHOTOMETER AND OBSERVATION METHOD

CROSS REFERENCE TO RELATED APPLICATION(S)

This application claims the benefit of Japanese Patent Application No. 2019-044976, filed Mar. 12, 2019, which is hereby incorporated by reference in its entirety into this application.

BACKGROUND OF THE INVENTION

1. Technical Field

The present disclosure relates to a fluorescence photometer and a method of observing a sample with the fluorescence photometer.

2. Description of the Related Art

A fluorescence photometer is an apparatus for identifying substances contained in a sample by irradiating the sample with excitation light and measuring fluorescent light generated from the sample. That is, a fluorescence photometer irradiates a sample with excitation light, separates fluorescent light emitted from the sample, and obtains spectral data such as an excitation spectrum, a fluorescence spectrum, a time change, and a three-dimensional fluorescence spectrum. Excitation light is incident on a predetermined area which is typically about 1 to 2 $cm^2$ varying depending on an optics, and fluorescent light emitted from the spot is detected.

Fluorescence photometers are divided into two types: inside measuring in which a sample is placed in a sample chamber and is irradiated with fluorescent light; and outside measuring in which, for measuring, excitation light is guided to a sample which is placed outside a sample chamber by a light-guiding member such as an optical fiber. With the latter type, it is possible to analyze a sample that is too large to be accommodated in a sample chamber because measurement can be performed outside the main body (sample chamber) of the fluorescence photometer. For example, excitation light is first introduced into an excitation-side fiber by a condensing optics and is then guided to the sample placed outside the sample chamber. Fluorescent light generated from the sample is received by a fluorescence-side fiber, guided to a fluorescence-side spectroscope through the condensing optics, and detected by a detector (Non-patent Document 1).

On the other hand, Patent Document 1 discloses a fluorescence fingerprint imaging apparatus using a spectral imaging technique. A general fluorescence photometer acquires spectral information from a spot irradiated with excitation light, but a fluorescence fingerprint imaging apparatus acquires an in-plane distribution of fluorescence emission information as an image. The fluorescence fingerprint imaging apparatus includes a light source (which is typically a white light source such as a xenon lamp or halogen lamp), an excitation-side spectroscope (which is typically an optical filter), an optics (for example, objective lens) for observation, and a fluorescence-side spectroscope (which is typically an optical filter). Spectroscopes such as liquid crystal tunable filters and acousto-optic element filters, which is an element transmitting a light of a variety of wavelengths have been commercially available. However, in terms of dealing with the ultraviolet range useful as excitation light, optical filters such as bandpass filters are considered suitable spectroscopes.

Patent Publication 2 discloses an observation device for a living body, wherein the device irradiates a sample with illumination, such as a white light, etc., which is not dispersed, as a light source through a light guide and acquire an image of the sample from an image sensor provided at the front end. Further, a reflection spectrum of the sample is calculated based on an image signal output from an RGB image sensor.

Patent Document 3 discloses a fluorescence endoscopic apparatus that irradiates a sample with incidence light having wavelengths selected by respective transmission filters, generates a fluorescence detection image, and calculates a light intensity distribution based on the image.

Documents of Related Art

Patent Document (Patent Document 1) Japanese Patent Application Publication No. 2012-98244
(Patent Document 2) Japanese Patent Application Publication No. 2006-314557
(Patent Document 3) Japanese Patent No. 5432793

Non-Patent Document (Non-patent Document 1) Susumu Shimoyama and Yuko Noda, "Identification of Dye used for Colored Thread for Dyed Fabric Brocade used in Ancient China through Three-dimensional Fluorescence Spectroscopy using Optical Fiber", Analytical Chemistry, Japan Analytical Chemistry Society, 1997, Vol. 46, No. 7, 571-578 page.

SUMMARY OF THE INVENTION

With a conventional fluorescence photometer, a fluorescence spectrum at the time of irradiating a sample with excitation light is acquired or a fluorescence intensity when the wavelength of excitation light is changed is acquired as an excitation spectrum. In this case, since a sample chamber to accommodate a sample needs to be a dark room, it is difficult to check an emission distribution, an emission color, emission intensity, and the like in a fluorescence surface of the sample when the sample is irradiated with excitation light.

According to the apparatus disclosed in Non-Patent Document 1, when a sample is too large to be contained in the sample chamber, a fluorescence spectrum and an excitation spectrum for the sample can be acquired outside the sample chamber by using a light-guiding member such as an optical fiber. However, as in the fluorescence photometer described above, a specific method of checking an emission distribution, an emission color, emission intensity, and the like in a fluorescence surface of the sample when the sample is irradiated with excitation light is not suggested.

On the other hand, since the fluorescence fingerprint imaging apparatus disclosed in Patent Document 1 uses a method of acquiring fluorescence information as an in-plane distribution image, it is possible to acquire fluorescence information as an image at the time of irradiating a sample with excitation light having an arbitrary wavelength. This apparatus uses optical filters on both the excitation side and the fluorescence side. Since a white light beam is separated by optical filters provided on the excitation side, excitation wavelengths are limited to the number of optical filters provided on the excitation side. In addition, the sample size that can be observed is restricted by the size of the sample stage of a microscope. In addition, in the case of the fluorescence side, since only intensity information can be obtained from an image generated based on light having passed through the optical filters by a CCD camera, fluorescence wavelengths are limited to the number of optical filters provided on the fluorescence side. For this reason, as many optical filters as the number of combinations of the excitation wavelengths and the fluorescence wavelengths are required to obtain fluorescence images corresponding to the number of the combinations. Therefore, the measurement time increases due to the work of replacing the optical filters. Therefore, it is necessary to take measures such as narrowing down the wavelength range necessary for analysis, and obtained information is limited.

The apparatus disclosed in Patent Document 2 is not intended to emit light of an arbitrary wavelength as irradiation light corresponding to excitation light. In addition, the apparatus performs an operation of simply calculating a reflection spectrum from an image signal but does not perform an operation of acquiring a fluorescence spectrum as an observed measurement value. The apparatus disclosed in Patent Document 3 calculates a light intensity distribution from an image of lights of wavelengths within a spectrum acquisition wavelength band. The calculated light intensity distribution includes a fluorescence spectrum. However, since the fluorescence spectrum is calculated from an image, the resolution of data and the wavelength interval are restricted.

The present disclosure provides a fluorescence photometer and an observation method that are capable of observing a sample of any size and of reducing an observation time.

According to the present disclosure there is provided a fluorescence photometer including a photometer unit and a light-guiding member. The photometer unit includes at least a light source, a excitation-side spectroscope configured to separate light emitted from the light source to generate excitation light, and a fluorescence-side spectroscope configured to separate fluorescent light emitted from a sample irradiated with the excitation light to generate monochromatic light. The light-guiding member guides the excitation light to the sample placed outside the photometer unit and guides the fluorescent light emitted from the sample to photometer unit. The light-guiding member includes: an imaging unit that images the sample; an excitation light-guiding member that is arranged around the imaging unit and guides the excitation light to be incident on the sample; and a fluorescent light-guiding member that is arranged around the imaging unit and guides the fluorescent light emitted from the sample to be introduced into the photometer unit. The excitation light-guiding member and the fluorescent light-guiding member are arranged to surround the imaging unit.

In the fluorescence photometer according to the present disclosure, the imaging unit may image the sample, for example, with reflection light of the excitation light incident on the sample.

In the fluorescence photometer according to the present disclosure, the image unit may be, for example, an image fiber configured by a bundle of a plurality of optical fibers, and each of the excitation light-guiding member and the fluorescent light-guiding member may be comprised of a plurality of optical fibers that are arranged around the image fiber in the form of a ring shape.

In the fluorescence photometer according to the present disclosure, for example, the light-guiding member may be a linear optical fiber unit protruding from a housing of the photometer unit.

According to the present disclosure, there is provided a method of observing a sample with a fluorescence photometer having a light-guiding member that guides excitation light to the sample and guides fluorescent light emitted from the sample, the method including: imaging, by a imaging unit of the light-guiding member, the sample to acquire an image of the sample; irradiating, by an excitation light-guiding member arranged around the imaging unit, the sample with the excitation light; and acquiring, by a fluorescent light-guiding member arranged around the imaging unit, a fluorescence spectrum based on the fluorescent light emitted from the sample, in which the acquisition of the image and the acquisition of the fluorescence spectrum are simultaneously performed while continuously changing the wavelength of the excitation light.

In the method according to the present disclosure, for example, a three-dimensional fluorescence spectrum may be acquired from three parameters of an excitation wavelength of the excitation light being continuously changed, a fluorescence spectrum wavelength of the fluorescent light, and a fluorescence intensity of the fluorescence spectrum.

According to the present disclosure, it is possible to obtain, at the same time, a spectrum and an image for the same observation target area of a sample by guiding excitation light that is separated into monochromatic light by an excitation-side spectroscope to the sample through an excitation light-guiding member, guiding light emitted from the sample to a fluorescence-side spectroscope through a fluorescent light-guiding member, and directly detecting the lights of respective wavelengths with a detector. In addition, with the use of the light-guiding member comprised of the excitation light-guiding member and the fluorescent light-guiding member, it is possible to acquire a spectrum and an image of an arbitrary target region of a sample having an arbitrary size.

BRIEF DESCRIPTION OF THE DRAWINGS

FIGS. 6A to 6D are diagrams illustrating images and spectrums resulting from observation of a sample, wherein FIG. 6A is an image obtained when the sample is irradiated with white light, FIG. 6B is a reflection spectrum obtained when the sample is irradiated with white light, FIG. 6C is an image obtained when the sample is irradiated with monochromatic light of an arbitrary wavelength, and FIG. 6D is a fluorescence spectrum obtained when the sample is irradiated with the monochromatic light.

DESCRIPTION OF THE PREFERRED EMBODIMENTS

Figure 1:
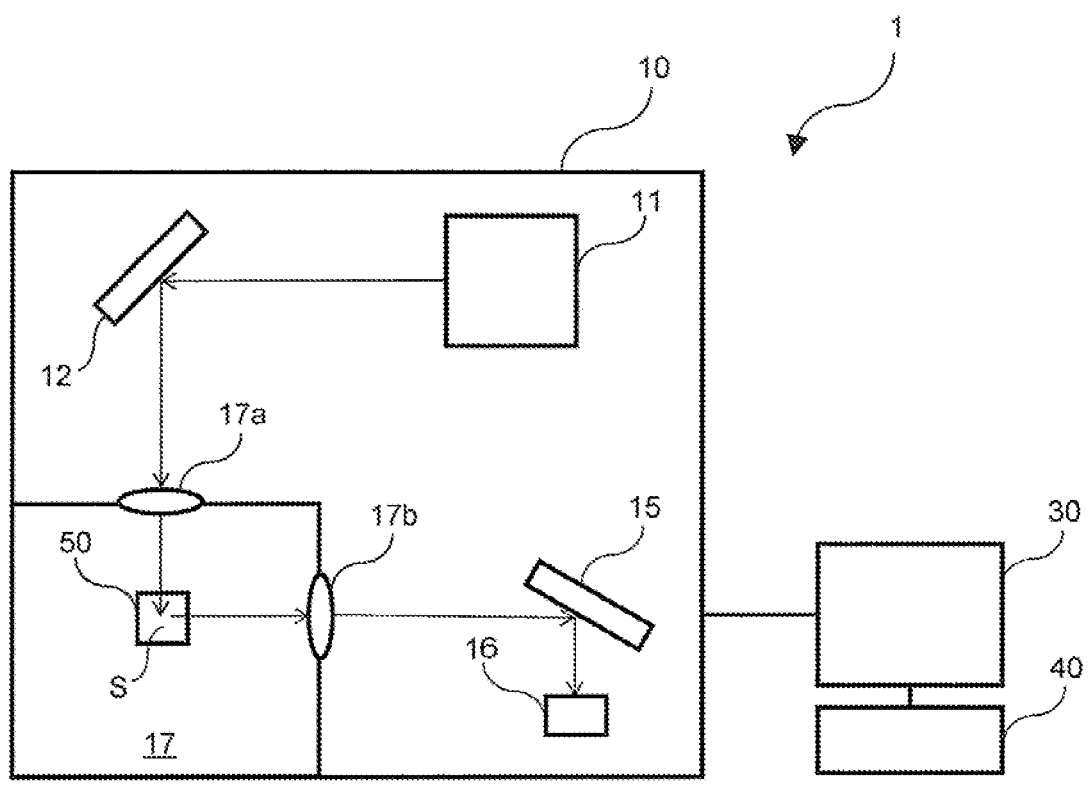
FIG. 1 is a schematic diagram illustrating a fluorescence photometer according to one embodiment of the present disclosure.
Figure 2:
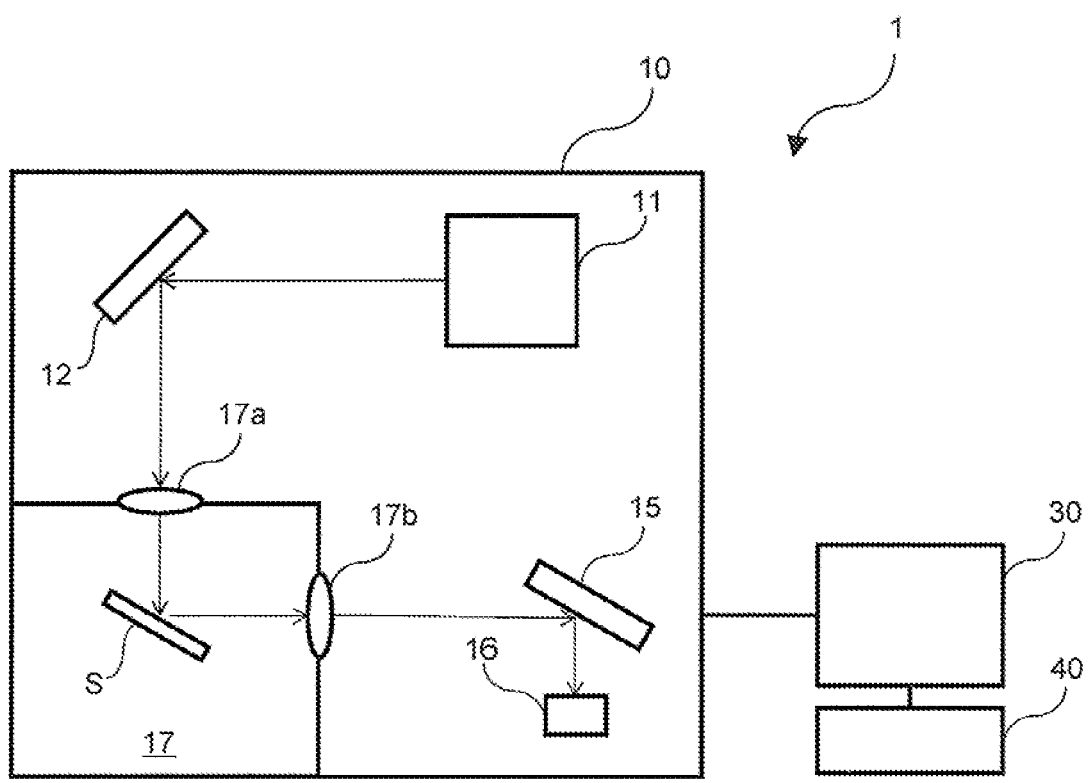
FIG. 2 is a schematic diagram illustrating a fluorescence photometer according to another embodiment of the present disclosure.

Hereinafter, specific embodiments of a fluorescence photometer according to the present disclosure will be described in detail with reference to the accompanying drawings. FIGS. 1 and 2 illustrate embodiments of the fluorescence photometerdisclosure to which the present disclosure is applied.

A fluorescence photometer 1 illustrated in FIG. 1 is an apparatus for irradiating a sample with excitation light and measuring fluorescent light generated from the sample. The fluorescence photometer 1 includes a photometer unit 10, a data processing unit 30 that controls the photometer unit 10 and analyzes the sample, and an operation unit 40 that performs an input operation and an output operation.

The photometer unit 10 includes a light source 11 that emits continuous light, an excitation-side spectroscope 12 that separates the light emitted from the light source 11 to generate excitation light, a fluorescence-side spectroscope 15 that separates fluorescent light emitted from the sample irradiated with the excitation light into monochromatic light, a detector (fluorescence detector) 16 that detects an electrical signal corresponding to the monochromatic fluorescent light, and a sample container 50 having a square cell shape and configured to contain and hold a sample S which is an observation target. The sample container 50 is provided in a sample chamber 17. The sample chamber 17 is shielded from the outside and blocks unnecessary light entering from the outside. The excitation light emitted from the excitation-side spectroscope 12 passes through an excitation light emission port 17a provided with a predetermined lens and disposed on a partition wall of the sample chamber 17 and reaches the sample S, thereby causing the sample S to emit fluorescent light. The generated fluorescent light passes through a fluorescent light introduction port 17b disposed on a partition wall of the sample chamber 17 and provided with a predetermined lens and reaches the fluorescence-side spectroscope 15.

The data processing unit 30 is a computer and includes a processing unit, an A/D converter for converting the fluorescent light emitted from the sample into a digital signal, and the like. The operation unit 40 includes an operation panel through which an operator inputs an input signal necessary for operation of the data processing unit 30. The operation unit 40 may be provided with a display device that displays various analysis results resulting from the operation of the data processing unit 30, an operation screen, and the like.

The data processing unit 30 outputs a signal according to the measurement conditions input by the operator via the operation unit 40, and the excitation-side spectroscope 12 is set to a target wavelength position. The data processing unit 30 outputs a signal according to the measurement conditions input by the operator via the operation unit 40, and the excitation-side spectroscope 15 is set to a target wavelength position. The excitation-side spectroscope 12 and the fluorescence-side spectroscope 15 have optical elements, such as diffraction gratings and prisms, having a predetermined slit width, and are driven by a pulse motor (not illustrated). The excitation-side spectroscope 12 and the fluorescence-side spectroscope 15 are configured to perform spectral scanning by rotating optical elements using drive-system components such as gears and cams. The excitation-side spectroscope 12 and the fluorescence-side spectroscope 15 can continuously separate the generated light into arbitrary monochromatic lights. The fluorescence photometer 1 can acquire a spectrum while continuously changing the wavelength of light rather than intermittently changing the wavelength of light.

The fluorescence photometer 1 illustrated in FIG. 1 is applied only to the case where the sample S is a liquid sample. The liquid sample is dispensed into the sample container 50 which is a 10 mm square cell and is introduced into the sample chamber 17. In this case, the excitation light is emitted and the fluorescent light generated from the sample in a direction having an angle of 90° with respect to the excitation light is measured. The observation of the fluorescent light is performed at the center of the 10 mm square cell.

The fluorescence photometer 1 illustrated in FIG. 2 is applied only to the case where the sample S is a solid sample. The sample S is placed on a solid sample holder 51. The surface of the sample is irradiated with the excitation light emitted from the excitation-side spectroscope 12, and the fluorescent light emitted from the sample is introduced into the fluorescence-side spectroscope 15 and is separated into monochromatic lights which are detected by the detector 16. When measurement is performed on a solid sample, a technique called surface photometry is used in which the surface of the sample S provided on the solid sample holder 51 is irradiated with the excitation light and the fluorescent light emitted from the surface of the sample S is detected. In this case, an optics is configured such that the excitation light and the fluorescent light have a positional relationship of 90°. As another exemplary measurement method for a solid sample, there is a technique in which a sample S is placed on an integrating sphere.

Figure 3:
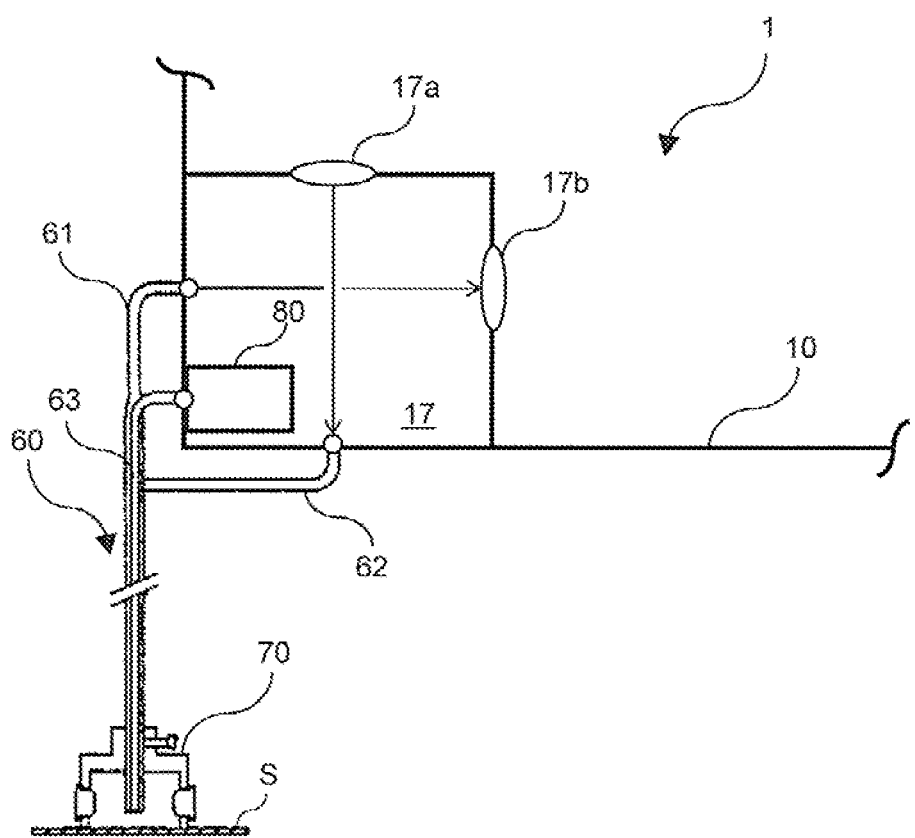
FIG. 3 is a schematic diagram illustrating a main portion of a fluorescence photometer according to the present disclosure.

FIG. 3 illustrates a main portion of a fluorescence photometer 1 according to the present disclosure, and the same structure can be applied to the fluorescence photometers 1 illustrated in FIG. 1 and FIG. 2. In the cases of the fluorescence photometers 1 of FIGS. 1 and 2, the sample S needs to be provided in the sample chamber 17 of the photometer unit 10. Therefore, the size of the sample S that can be observed with the fluorescence photometers 1 of FIGS. 1 and 2 is limited. On the other hand, in the case of the fluorescence photometer 1 having the configuration of FIG. 3, the sample S that is a target to be observed is not placed inside the sample chamber 17 but is placed outside the photometer unit 10. For this reason, measurement for a sample of a large size that cannot be accommodated in the sample chamber 17 can be performed. The fluorescence photometer 1 according to the present embodiment includes a linear optical fiber unit 60 serving as a light-guiding member and projecting from the outer surface of the housing of the photometer unit 10. The linear optical fiber unit 60 guides the excitation light from the photometer unit 10 to the sample S and guides the fluorescent light emitted from the sample S to the photometer unit 10. In the present embodiment, the measurement is performed with the optical fiber unit 60 fixed to the surface of the sample S by a fixing jig 70 which is an optional element. Alternatively, the measurement may be performed with the optical fiber unit 60 sliding along the surface of the sample S in a state in which the optical fiber unit 60 is gripped by an operator's hand or a predetermined robot. The optical fiber unit 60 is linear and flexible and has good operability.

The optical fiber unit 60 includes an excitation-side fiber 61, a fluorescence-side fiber 62, and an image fiber 63. The excitation-side fiber 61 functions as an excitation light-guiding member that guides the excitation light passing through the excitation light emission port 17a to an emission portion located at the front end of the optical fiber unit 60 and that emits the excitation light from the emission portion toward the sample S. The fluorescent light generated from the sample S when the sample S is irradiated with the excitation light is introduced into an introduction port of the fluorescence-side fiber 62. The fluorescence-side fiber 62 functions as a fluorescent light-guiding member that guides the fluorescent light to a fluorescent light introduction port 17b. The fluorescent light passing through the fluorescent light introduction port 17b reaches the fluorescence-side spectroscope 15.

The image fiber 63 functions as an imaging unit that images the sample S by receiving the reflection light of the excitation light emitted from the emission portion, and an image sensor of a camera unit 80 provided in the photometer unit 10 generates an image of the sample. The image generated by the camera unit 80 is transmitted to the data processing unit 30, and the data processing unit 30 outputs the image to the display device of the operation unit 40.

Figure 4:
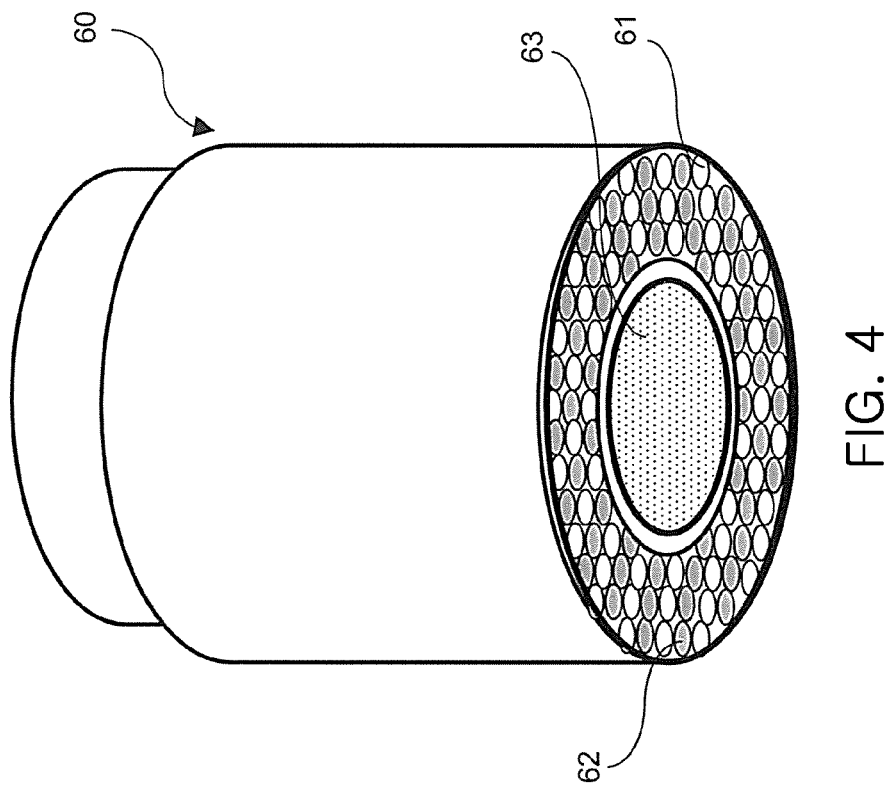
FIG. 4 is an enlarged view illustrating a front end portion of an optical fiber unit.

FIG. 4 is an enlarged view illustrating a front end portion of the optical fiber unit 60. The image fiber 63 is arranged at the center of the cross section of the optical fiber unit 60, and the excitation-side fiber 61 and the fluorescence side fiber 62 are arranged outside the image fiber 63 in a bundled state. As the image fiber 63, a bundled fiber in which a plurality of fibers is bundled to form one unit may be used. In addition, the front end portion of the image fiber 63 may be equipped with an objective lens (not illustrated) and a mechanism for adjusting the focus on the sample S. The objective lens may vary depending on factors such as the size of the sample S, the size of the target region to be observed, and the required magnification.

Similarly, the excitation-side fiber 61 arranged outside the image fiber 63 is comprised of a plurality of fibers which are arranged to surround the image fiber 63, for example, in the form of a ring shape. Similarly, the fluorescence-side fiber 62 is also comprised of a plurality of fibers which are arranged, for example, in the form of a ring shape to surround the image fiber. It is desirable for excitation-side fibers 61 and fluorescence-side fibers 62 to be present uniformly around image fibers 64, which are arranged randomly or periodically within a ring region surrounding the image fibers 64, such that the presence of excitation-side fibers 61 and the presence of fluorescence-side fibers 62 are not skewed between each other. In this example, multiple optical fibers constituting the image fiber 63 are bundled to form a core fiber, the excitation fiber 61 and the fluorescence fiber 62, each comprised of a plurality of optical fibers, are bundled around the core fiber, and these fibers 61, 62, and 63 are encased by an external cover to form the optical fiber unit 60.

Figure 5:
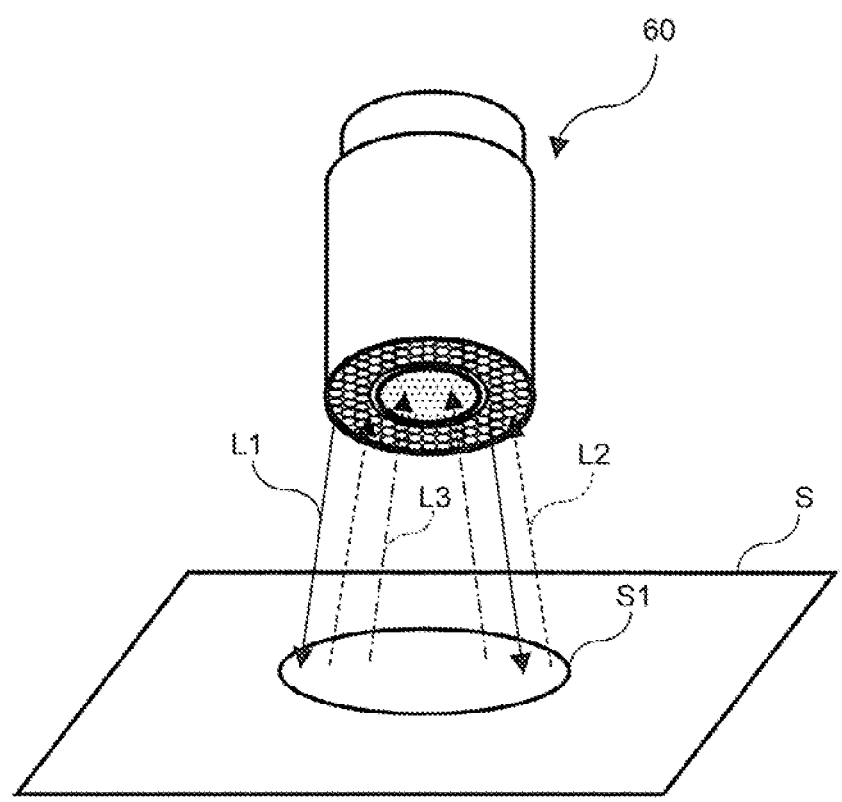
FIG. 5 is a diagram schematically illustrating a light beam generated around the tip portion of the optical fiber unit at the time of measurement.
Figure 6A:
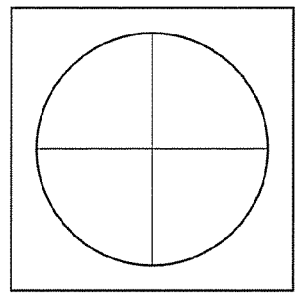
Figure 6B:
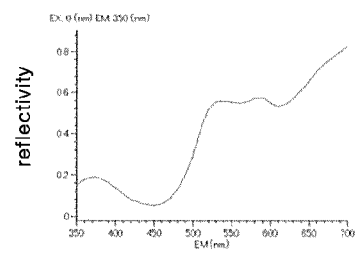
Figure 6C:
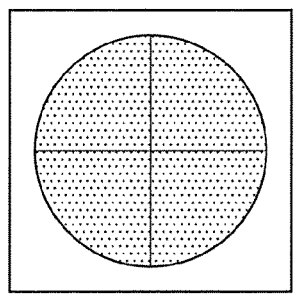
Figure 6D:
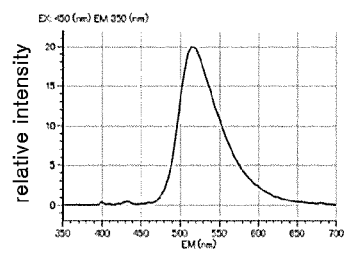

FIG. 5 is a diagram schematically illustrating a light beam generated at around the front end portion of the optical fiber unit 60 at the time of measurement. Irradiation light L1, which is the excitation light emitted from the excitation-side fiber 61, is incident on the sample S, and the sample S emits reflection light and fluorescent light. Observation light L2, which is the fluorescent light for measurement of a fluorescence spectrum, is introduced into the fluorescence-side fiber 62, and reflection light L3 for imaging of the sample is introduced into the image fiber 63.

The excitation-side fiber 61 serving as the excitation light-guiding member and the fluorescence-side fiber 62 serving as the fluorescent light-guiding member are arranged in such a manner to surround the image fiber 63 serving as the imaging unit. That is, since the excitation-side fiber 61 is arranged to substantially evenly surround the image fiber 63, the surface of the target area S1 of the sample S can be substantially uniformly irradiated with the excitation light and substantially uniform reflection light can be obtained. Therefore, an image of the sample S that is less affected by uneven irradiation can be obtained. In addition, since the fluorescence-side fiber 62 is arranged to substantially evenly surround the outside of the image fiber 63, the fluorescent light emitted from the sample S can be efficiently collected. The term "substantially uniform" does not require to be perfectly uniform but requires only that the image of the sample has little irradiation unevenness to the extent that measurement is not hindered and fluorescent light can be obtained evenly.

With this configuration, irradiation, spectrum observation, and camera photographing can be simultaneously performed on the same target area S1. However, the reflection light generated from the sample S is not limited only to the reflection light of the excitation light incident on the sample S. The reflection light may be reflection light of natural light incident on the sample S or reflection of illumination light emitted from a light source (not illustrated) and being incident on the sample S. In this case, observation targets are reflection light and fluorescent light, and the fluorescent light attributable to the natural light from the surrounding environment and the fluorescent light attributable to illumination light emitted from an additional light source are also observed.

FIG. 6 illustrates an example of an image, a reflection spectrum, and a fluorescence spectrum observed for the sample S. In the characteristic diagram of the fluorescence spectrum of FIG. 6, the horizontal axis represents a fluorescence wavelength EM (nm). By setting the light emitted from the excitation-side spectroscope 12 to so-called zero-order light (excitation wavelength EX=0 nm), the sample S can be irradiated with white light that is not dispersed. As illustrated in FIG. 6A, by capturing an image when the sample is irradiated with white light, an image can be obtained based on the reflection light of the white light. In addition, the excitation-side spectroscope 12 is fixed to the zero-order light, the distribution of the amount of light of each wavelength of a white sample which is a standard sample additionally prepared, is detected by the fluorescence-side spectroscope 15, and the intensity detected at this time is set as a reference value of 1.0. Then, a reflection spectrum illustrated in FIG. 6B can be obtained by converting the distribution of the amount of light of each wavelength of the reflection light generated from the sample S into a ratio with the distribution of the amount of light of the white sample. At the time of white light irradiation, an image and a reflection spectrum for the same target area S1 of the sample S can be obtained.

On the other hand, the excitation-side spectroscope 12 is adjusted so as to irradiate the sample S with monochromatic light of an arbitrary wavelength (450 nm in FIGS. 6C and 6D, i.e., excitation wavelength EX=450 nm), the fluorescent light emitted from the sample S is measured, and the distribution of intensity of each wavelength of the fluorescent light corresponding to the monochromatic light is detected. In this way, the fluorescence spectrum illustrated in FIG. 6D can be obtained. In this case, the image of the sample S (see FIG. 6C) which is captured by the image fiber 63 simultaneously with the observation of the fluorescent light is a fluorescence image. That is, at the time of monochromatic light irradiation, it is possible to obtain a fluorescence image and a fluorescence spectrum for the same target region S1 of the sample S.

According to a method of observing a sample using the fluorescence photometer 1 of the present disclosure, it is possible to obtain an image and a fluorescence spectrum of a sample at the same time while continuously varying the wavelength of excitation light generated by the excitation-side spectroscope 12. That is, since the excitation light is not intermittently changed but is continuously changed in wavelength, the image of the sample can be obtained through direct photographing and precise observation of the sample is enabled. In addition, since it is not necessary to exchange filters for changing the wavelength of the excitation light and it is possible to obtain an image and a fluorescence spectrum of the sample at the same time, observation time can be reduced. Here, the term "simultaneously" or "at the same time" does not require exactly the same timing but means a case where the acquisition of the image and the acquisition of the fluorescence spectrum are performed substantially in the same manner without a special operation or step being performed between the acquisition of the image and the acquisition of the fluorescence spectrum.

Figure 7:
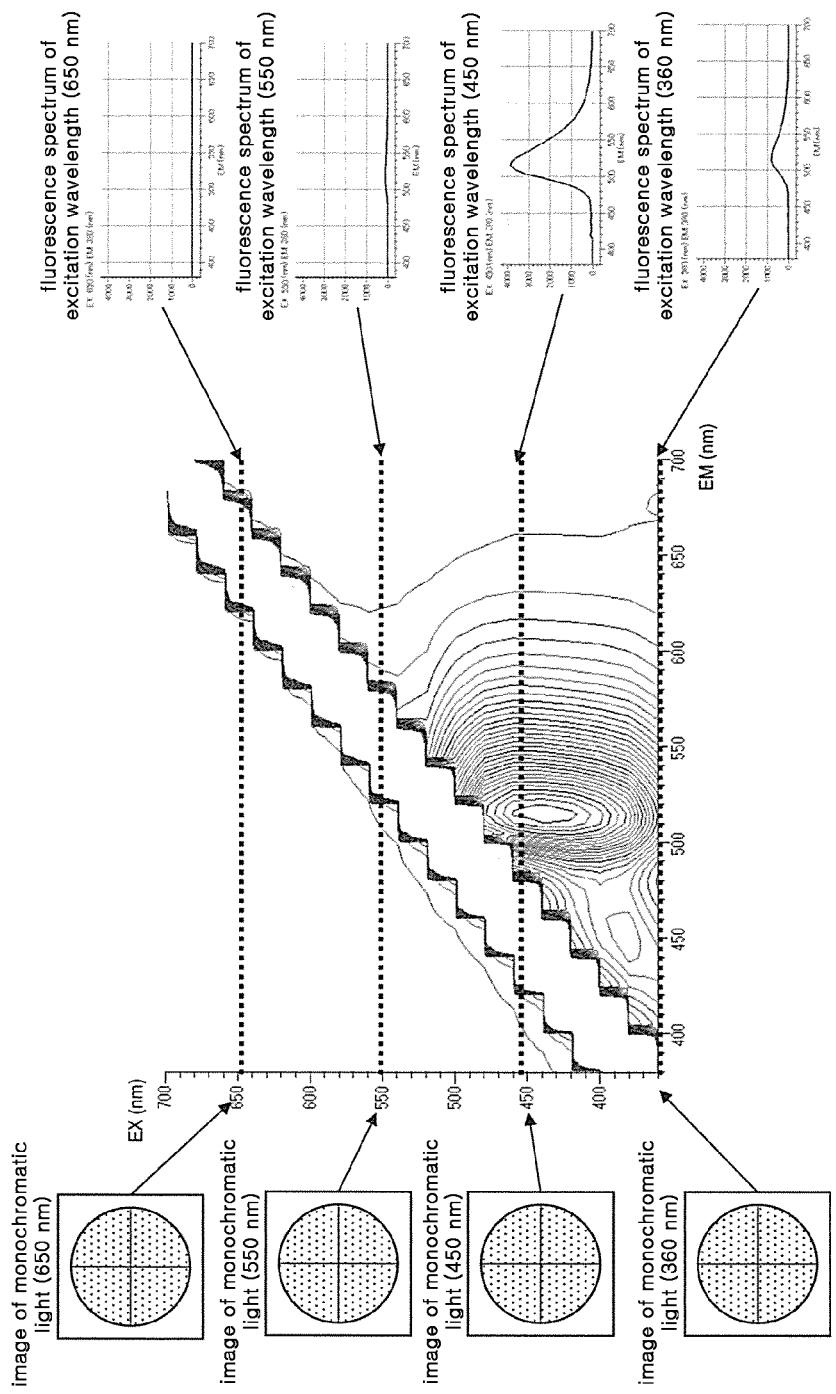
FIG. 7 is a diagram illustrating an example of a three-dimensional fluorescence spectrum and image data.

FIG. 7 illustrates an example in which a fluorescence spectrum and an image are obtained with excitation wavelength being continuously changed by the excitation-side spectroscope 12. In the characteristic diagram of the three-dimensional fluorescence spectrum illustrated in FIG. 7, the vertical axis represents an excitation wavelength EX (nm), and the horizontal axis represents a fluorescence wavelength EM (nm). Since the fluorescence photometer 1 is structured to continuously separate light emitted from the light source 11, when an arbitrary target region in the sample S is irradiated with light of arbitrary excitation wavelength by the optical fiber unit 60, it is possible to simultaneously obtain the image and the fluorescence spectrum for the target region. In this case, it is possible to acquire the three-dimensional fluorescence spectrum illustrated in FIG. 7 by drawing a contour map of the fluorescence spectrum based on three parameters of an excitation wavelength, a fluorescence wavelength, and a fluorescence intensity observed when the excitation wavelength is continuously changed. In other words, in the present embodiment, since the optical fiber unit 60 is used to acquire the image of the sample when the excitation wavelength is continuously changed and to acquire the fluorescence spectrum of the sample when the excitation wavelength is changed, the measurement for an arbitrary target region can be easily performed.

Figure 8:
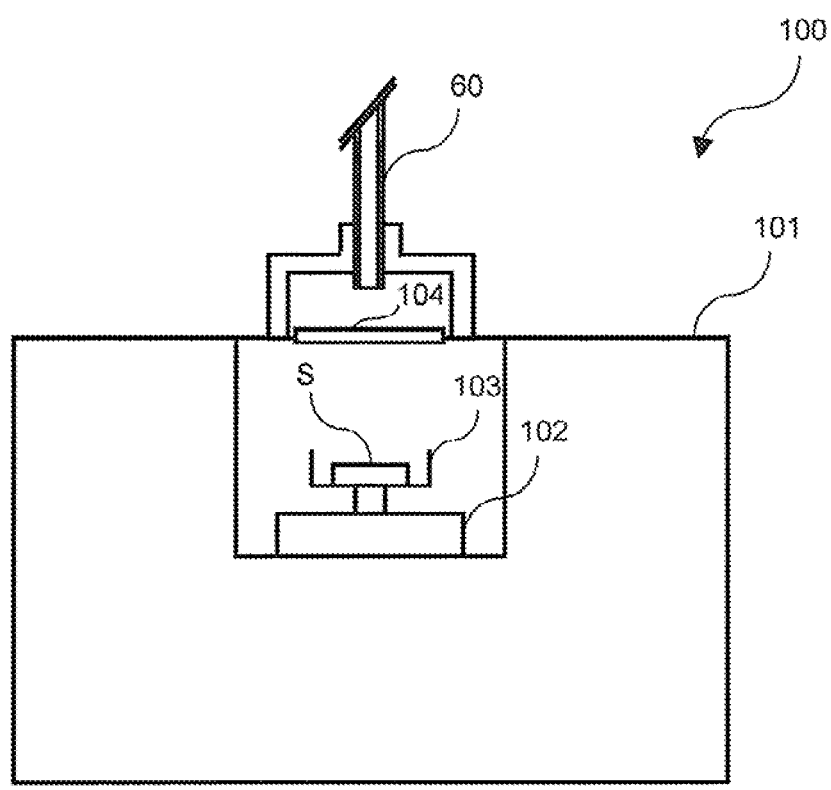
FIG. 8 is a schematic diagram of a heating apparatus.
Figure 9:
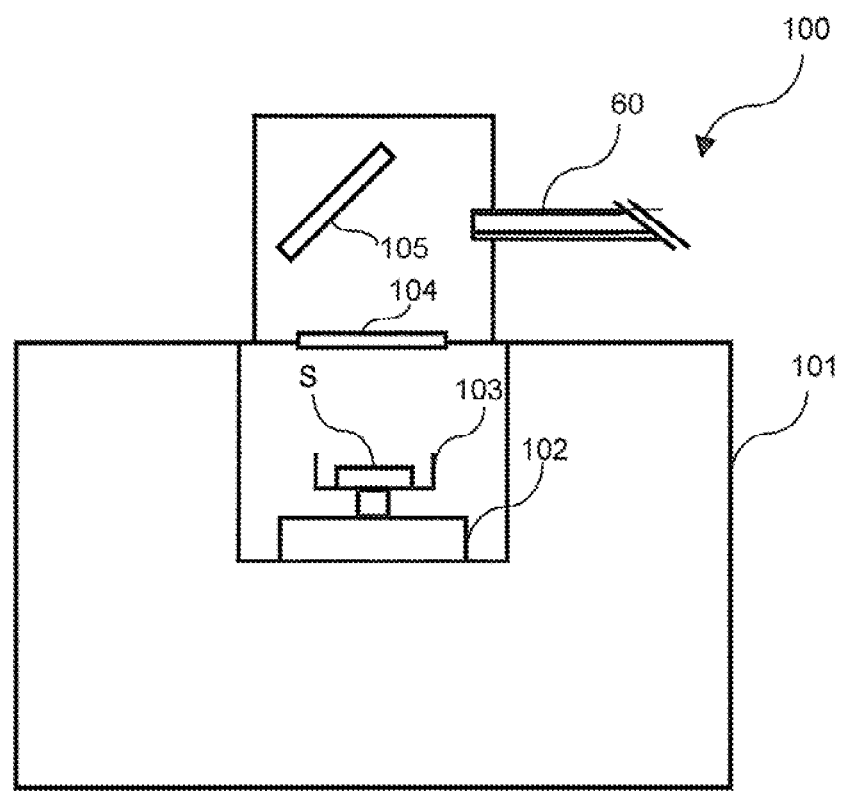
FIG. 9 is a schematic diagram of another heating apparatus.
Figure 10:
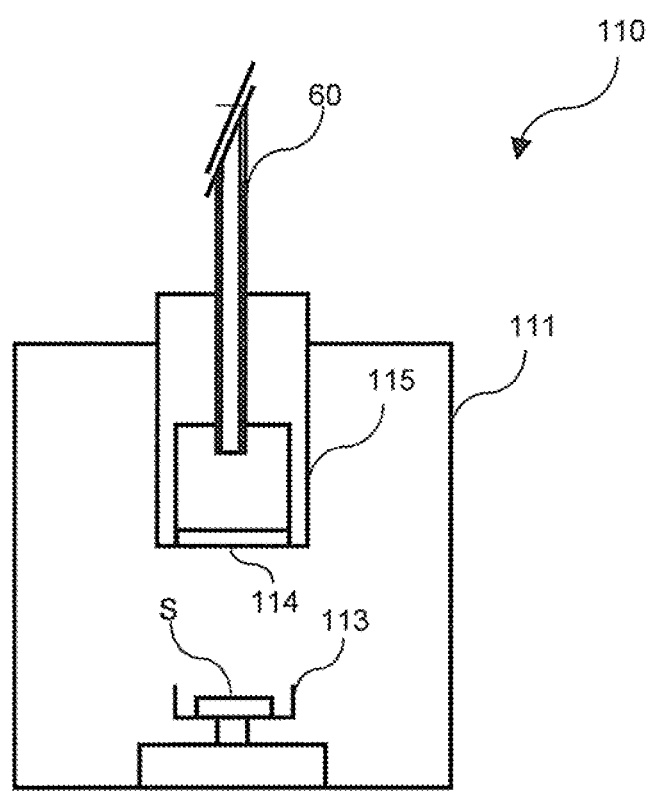
FIG. 10 is a schematic diagram of a gas exchanging chamber.

FIGS. 8 to 10 illustrate application examples of the optical fiber unit 60 described above. FIG. 8 illustrates a heating apparatus 100 that heats a sample during observation of the sample. The heating apparatus 100 includes a heating furnace body 101, a heater 102 disposed inside the heating furnace body 101, a sample container 103 which is mounted on the heater 102 and in which a sample S is contained, and a light-transmissible window 104 provided at an upper portion of the heating furnace body 101. The heater 102 heats the sample S via the sample container 103. The optical fiber unit 60 is attached to the window 104 by a fixing jig 70. Therefore, the optical fiber unit 60 acquires an image of the sample S and measures a spectrum through the window 104.

The window 104 transmits light but suppresses radiation of heat from the heating furnace body 101, thereby protecting the optical fiber unit 60 from the heat. In order to observe the sample S placed in the heating furnace body 101 while suppressing the radiation of heat, the window 104 is desirably made of a material having a high heat resistance and a high transmittance (for example, a transmittance of 80% or more as a guide) for a wavelength range to be used. For example, synthetic quartz is a suitable material. In addition, in order to suppress the radiation of heat, the window 104 is optionally provided with a coating that reflects infrared rays. It is necessary that the coating has a sufficient transmittance for a wavelength range to be used (as a guide, a transmittance of 80% or more). When the window 104 exhibits transmittance varying depending on wavelength, the shape of the excitation spectrum or the fluorescence spectrum is influenced by the transmittance. In this case, correction may be performed on a transmission spectrum. When the window 104 exhibits transmittance varying depending on wavelength, the color of the obtained image is influenced by the transmittance. In this case, the RGB luminance values may be corrected using the transmission spectrum.

FIG. 9 illustrates another example of the heating apparatus 100. In this example, a mirror 105 is provided between the window 104 and the optical fiber unit 60 and observation is performed through the mirror 105. Therefore, the radiant heat from the heating furnace body 101 is further reduced, and the likelihood that the optical fiber unit 60 is damaged due to the heat is further reduced. The mirror 105 is preferably made of a material having a high reflectivity (for example, 80% or more as a guide) on a mirror surface, such as aluminum, for the purpose of illuminating excitation light, observing a spectrum, and photographing an image. The mirror 105 may be flat or have a spherical structure having a focal point. In order to further reduce the influence of the radiant heat, a guide for blocking the radiant heat may be additionally provided between the window 104 and the mirror 105. As in the apparatus of FIG. 8, the window 104 may be provided with a coating for shielding infrared rays, and the mirror 105 may be a half mirror having optical characteristics of transmitting infrared rays and reflecting ultraviolet rays used for observation and visible light rays.

FIG. 10 is a schematic diagram of a gas exchanging chamber. The gas exchanging chamber 110 includes a chamber body 111, a sample container 113 which is disposed in a space inside the chamber body 111 and in which a sample S is contained, and a chamber adaptor 115 for attaching the optical fiber unit 60 to an upper portion of the chamber body 111. The gas exchanging chamber 110 enables observation of the sample S in a state in which desired ambience such as a vacuum ambience or a nitrogen ambience is maintained. The bottom of the chamber adaptor 115 is provided with a light-transmissible window 114 for shielding the gas exchanging chamber 110 from the outside. The window 114 is used to observe the sample S while maintaining the ambience inside the chamber body 111. Therefore, desirably, the window 114 is rigid and has a high transmittance (as a guide, a transmittance of 80% or more) for a wavelength range to be used. For example, synthetic quartz is a suitable material.

According to the present disclosure, the fluorescence photometer is provided with the optical fiber unit for light irradiation, spectrum detection, and image acquisition and detection, the sample is irradiated with light of an arbitrary wavelength by the excitation-side spectroscope, and an image of the sample is acquired while a fluorescence spectrum is acquired by the fluorescence-side spectroscope with respect to the light emitted from the sample. With the use of the optical fiber unit, a sample placed outside a photometer unit provided with a light source, an excitation-side spectroscope, a fluorescence-side spectroscope, and the like can be observed and measurement can be performed regardless of the size of the sample. In addition, since the acquisition of the spectrum and the acquisition of the image can be simultaneously performed, it is possible to reduce an observation time for the sample.

It should be noted that the present disclosure is not limited to the above-described embodiments and can be appropriately modified, improved, etc. In addition, the material, shape, dimension, numerical value, form, number, location, and the like of each component in the above-described embodiment are arbitrary and are not limited as long as the present disclosure can be achieved.

As the light guiding-member, other light guide means such as a liquid light guide can be used instead of the optical fiber. For example, an image fiber configured by a bundle of a plurality of optical fibers may be used as the central image fiber, and a liquid light guide may be used for each of the excitation light-guiding member and the fluorescent light-guiding member. In this case, the excitation light guide member and the fluorescent light guide member each being configured with a liquid guide are arranged in a ring shape around the image fiber.

What is claimed is:

1. A fluorescence photometer comprising:
   a photometer unit including at least a light source, an excitation-side spectroscope that separates light emitted from the light source to generate excitation light, and a fluorescence-side spectroscope that separates fluorescent light emitted from a sample that is irradiated with the excitation light to generate monochromatic light; and
   a light-guiding member configured to guide the excitation light to the sample placed outside the photometer unit and to guide the fluorescent light emitted from the sample to the photometer unit, wherein the light-guiding member comprises an imaging unit to capture an image of the sample, an excitation light-guiding member arranged around the imaging unit and configured to guide the excitation light such that the excitation light is incident on the sample, and a fluorescent light-guiding member arranged around the imaging unit and configured to guide the fluorescent light emitted from the sample to the photometer unit;
   a heating apparatus configured to heat the sample during observation of the sample, wherein the heating apparatus comprises a heating furnace body, a heater disposed inside the heating furnace body, a sample container which is mounted on the heater and in which the sample is contained, and a light-transmissible window provided at an upper portion of the heating furnace body and a fixing jig which is configured to fix the light-guiding member to the heating apparatus,
   wherein the excitation light-guiding member and the fluorescent light-guiding member are arranged to surround the imaging unit,
   wherein the light-transmissible window is made of synthetic quartz and provided with a coating that reflects infrared rays, and
   wherein a mirror is provided between the light-transmissible window and the imaging unit and observation is performed through the mirror.

2. The fluorescence photometer according to claim 1, wherein the imaging unit captures the image of the sample based on reflection light which is reflection of the excitation light incident on the sample.

3. The fluorescence photometer according to claim 2, wherein the imaging unit comprises an image fiber formed by a bundle of a plurality of optical fibers, and
   each of the excitation light-guiding member and the fluorescent light-guiding member is comprised of a plurality of optical fibers that are arranged around the image fiber to form a ring shape.

4. The fluorescence photometer according to claim 3, wherein the light-guiding member is a linear optical fiber unit protruding from a housing of the photometer unit.

5. The fluorescence photometer according to claim 2, wherein the light-guiding member is a linear optical fiber unit protruding from a housing of the photometer unit.

6. The fluorescence photometer according to claim 1, wherein the imaging unit comprises an image fiber formed by a bundle of a plurality of optical fibers, and
   each of the excitation light-guiding member and the fluorescent light-guiding member is comprised of a plurality of optical fibers that are arranged around the image fiber to form a ring shape.

7. The fluorescence photometer according to claim 6, wherein the light-guiding member is a linear optical fiber unit protruding from a housing of the photometer unit.

8. The fluorescence photometer according to claim 1, wherein the light-guiding member is a linear optical fiber unit protruding from a housing of the photometer unit.

9. A method of observing a sample by using a fluorescence photometer including a light-guiding member configured to guide excitation light to the sample and to guide fluorescent light emitted from the sample, the method comprising:
   heating the sample by a heating apparatus,
   acquiring an image in a manner that an imaging unit of the light-guiding member captures the image of the sample; and
   acquiring a fluorescence spectrum in a manner that an excitation light-guiding member arranged around the imaging unit irradiates the sample with the excitation light and a fluorescent light-guiding member arranged around the imaging unit acquires the fluorescence spectrum based on the fluorescent light emitted from the sample,
   wherein acquiring of the image and acquiring of the fluorescence spectrum are simultaneously performed during heating the sample while continuously varying a wavelength of the excitation light,
   wherein the heating apparatus comprises a heating furnace body, a heater disposed inside the heating furnace body, a sample container which is mounted on the heater and in which the sample is contained, and a light-transmissible window provided at an upper portion of the heating furnace body and a fixing jig which is configured to fix the light-guiding member to the heating apparatus,
   wherein the light-transmissible window is made of synthetic quartz and is provided with a coating that reflects infrared rays and
   wherein a mirror is provided between the light-transmissible window and the imaging unit and observation is performed through the mirror.

10. The method according to claim 9, wherein a three-dimensional fluorescence spectrum is acquired based on three parameters of an excitation wavelength of the excitation light being continuously varied, a fluorescence wavelength of the fluorescent light, and a fluorescence intensity of the fluorescence spectrum.

* * * * *